(12) United States Patent
Tilscher et al.

(10) Patent No.: US 7,794,348 B2
(45) Date of Patent: Sep. 14, 2010

(54) VARIABLE-SPEED TRANSMISSION FOR A POWER-GENERATING PLANT

(75) Inventors: Martin Tilscher, Heidenheim (DE); Andreas Basteck, Lörrach (DE)

(73) Assignee: Voith Turbo GmbH & Co. KG., Heidenheim (DE)

( * ) Notice: Subject to any disclaimer, the term of this patent is extended or adjusted under 35 U.S.C. 154(b) by 354 days.

(21) Appl. No.: 11/629,373

(22) PCT Filed: Feb. 15, 2005

(86) PCT No.: PCT/EP2005/001484

§ 371 (c)(1),
(2), (4) Date: Dec. 12, 2006

(87) PCT Pub. No.: WO2005/121550

PCT Pub. Date: Dec. 22, 2005

(65) Prior Publication Data

US 2008/0197636 A1 Aug. 21, 2008

(30) Foreign Application Priority Data

Jun. 12, 2004 (DE) .................. 10 2004 028 619

(51) Int. Cl.
*F16H 47/08* (2006.01)
*F16H 47/10* (2006.01)
*F03D 9/00* (2006.01)

(52) U.S. Cl. .............................. 475/53; 475/34; 290/44; 290/55

(58) Field of Classification Search .................. 475/33, 475/34, 47, 48, 49, 53, 59; 74/718, 720, 74/730.1; 460/170 R, 171; 290/44, 55
See application file for complete search history.

(56) References Cited

U.S. PATENT DOCUMENTS 4,239,977 A * 12/1980 Strutman ..................... 290/44

(Continued)

FOREIGN PATENT DOCUMENTS

DE 653 589 11/1937

(Continued)

OTHER PUBLICATIONS

H. Höller: "Multi-Stage Variable Speed Drive—a Hydrodynamic Planetary Gear Unit with High Efficiency" Mar. 1993 (3 pages).

(Continued)

*Primary Examiner*—Roger Pang
(74) *Attorney, Agent, or Firm*—Ohlandt, Greeley, Ruggiero & Perle, L.L.P.

(57) ABSTRACT

A variable-speed transmission for a power-generating plant; with an input shaft which is connected at least indirectly with a power transducer of a wind-energy generator or hydroelectric generator; with an output shaft which is connected at least indirectly with an electric generator, with the speed of the output shaft being substantially constant; with a superposition gear which is connected at least indirectly with the input shaft and which divides power among a first power branch connected at least indirectly with the output shaft and a second power branch; with the second power branch comprising at least two hydrodynamic circulations, with at least one of the hydrodynamic circulations being at least indirectly in connection with the first power branch.

22 Claims, 7 Drawing Sheets

U.S. PATENT DOCUMENTS

| | | | | | |
|---|---|---|---|---|---|
| 4,586,400 | A | * | 5/1986 | Nygren | 475/2 |
| 4,718,298 | A | * | 1/1988 | Ohkubo | 475/34 |
| 4,726,255 | A | * | 2/1988 | Humpfer et al. | 475/34 |
| 4,774,855 | A | | 10/1988 | Murrell et al. | 74/687 |
| 4,964,843 | A | | 10/1990 | Wahl et al. | 475/34 |
| 6,911,743 | B2 | * | 6/2005 | Ishizaki | 290/55 |
| 7,259,471 | B2 | * | 8/2007 | Basteck | 290/43 |
| 2008/0054642 | A1 | * | 3/2008 | Nitzpon et al. | 290/44 |

FOREIGN PATENT DOCUMENTS

| | | | |
|---|---|---|---|
| DE | 16 00 228 A1 | | 2/1970 |
| GB | 504 390 A | | 4/1939 |
| GB | 2 136 883 A | | 9/1984 |
| JP | 2004162652 A | * | 6/2004 |
| WO | WO 81/01444 | | 5/1981 |
| WO | WO 2004/088132 | | 10/2004 |

OTHER PUBLICATIONS

Voith Turbo: "Vorecon Variable Speed Planetary Gear" Apr. 2003 (4 pages).
Voith Turbo: "WinDrive" Apr. 2005 (2 pages).
International Search Report based on PCT/EP2005/001484, dated Jun. 22, 2005.

* cited by examiner

VARIABLE-SPEED TRANSMISSION FOR A POWER-GENERATING PLANT

The invention relates to a variable-speed transmission for a power-generating plant, especially such a one which is driven by a fluid flow engine such as a wind-energy generator or hydro-electric generator and produces electric power by means of an electric generator.

Power-generating plants which remove kinetic energy from an air or water flow by means of a power transducer show special characteristics for two reasons. On the one hand, the maximum available kinetic energy of the flow medium fluctuates over time. On the other hand, the power conversion of the kinetic energy of the flow into the kinetic energy of the power transducer (e.g. a wind rotor or a water turbine) shows inherent characteristics which assign to each flow speed an optimal speed of the power transducer in which a maximum power conversion occurs. The assigned flow speeds and the optimal speeds depend on the geometrical configuration of the power transducer. The associated flow speeds and the optimal rotational speeds depend on the dimensions and the geometrical configuration of the power transducer. It follows from this that the power-generating plant such as a water or hydro electric plant must preferably be operated with a variable input speed which on its part must be adjusted as optimal as possible to the respectively applied flow speed of the working medium.

A further requirement placed on a power-generating plant as described above is obtained from the fact that the electric generator is connected to an interconnected network grid which typically works with a constant system frequency. Since the constant system frequency concerns the primary control variable for stabilizing an interconnected network grid, the power supplied by the power-generating plant into the grid must be supplied in a frequency- and phase-conform manner. On the one hand, this can be achieved by a frequency converter which allows exciting a generator with the respectively required frequency to compensate the difference to the system frequency and to thus realize a variable-speed generator. The difficulty in this approach for power-generating plants driven by the kinetic energy of a flow medium is that the power absorption characteristics of a wind rotor or a water turbine can be emulated only within limits for a frequency converter and complex requirements are placed on the open-loop or closed-loop control as a result of the stiffness of the defined generator characteristics by the frequency converter. As a result, the known realizations where frequency converters are realized for linking a conventional power-generating plant to an interconnected grid network are not optimal for the reason that harmonic loads on the grid and the generation of significant reactive power are unavoidable. A contrary path is therefore described in the present application and a variable-speed transmission is proposed for a conventional power-generating plant whose output shaft revolves substantially with a constant speed and an input speed can be realized which is speed-variable at the same time and can be guided along an optimal setpoint speed. This enables both driving a speed-constant electric generator as well as realizing optimal power absorption from the flow medium in the part-load range.

The following approaches have become known for the transmission that meets these requirements:

In a first system, the kinetic energy taken up by the power transducer from the flow medium is transmitted to a superposition gear. A power division to an electric generator and a small servo-motor is realized in the superposition gear. Approximately one-third of the input power is usually transmitted to the servomotor. As a result of the fact that the servomotor is operated with different frequencies either as a motor or as a generator, the generator speed can be stabilized and that the generator can be operated in a frequency-locked manner and can be connected directly with the grid. The servomotor on its part is connected by a frequency converter to the grid or is supplied alternatively by an auxiliary motor which is coupled mechanically with the generator. The described system is complex with respect to its control technology and is limited in its efficiency. The problems as explained above also occur when using frequency converters.

The electric servomotor is replaced in a second system which operates hydro-statically by hydraulic pumps and motors. The problem of complex control characteristics also occur in this case. An additional factor is a sluggish response characteristic and relevant delay times and high non-linearity factors as a result of the hydraulic components.

In power-generating plants such as wind and water power stations, there are further requirements in addition to the principal problems as described above in connection with the drive of an electric generator which is coupled with an interconnected grid network. These arise from special operating states such as the starting or stopping process, the load shedding as a result of a serious grid instability or speed limitation on the input shaft under full load conditions. The latter requirement is obtained especially in wind power stations whose rotor blade tips should not exceed a certain speed in order to keep the noise below a certain threshold value. The respective threshold value can vary depending on the location of the wind power station such as an onshore or offshore location. Even in the case of the speed-limited wind power station, there should remain a certain softness in the reactivity, which means that under the occurrence of a wind gust even a speed-limited wind power station should allow an increase of the rotor speed for a short period which is then returned to the threshold value immediately thereafter. If the transmission meets such a requirement, any occurring power impulses can be limited. It is preferable when the additional energy made available by a wind gust is taken up by the power-generating plant and can be utilized in the form of higher power output.

The invention is based on the object of providing a power-generating plant which comprises a transmission which meets the above requirements. Especially, the transmission should produce a substantially constant output speed for driving an electric generator coupled directly with an interconnected grid network. The input shaft should follow in a speed-variable manner the optimal power absorption characteristics for the power transducer such as the wind rotor or the water turbine. Moreover, the input speed should also be guidable or reducible above a predetermined threshold value. In addition to speed limitation, such operating states are starting or stopping phases or load shedding for example. A transmission for a power-generating plant is further provided which shows a favorable control characteristic and a certain softness in the reactivity and is characterized by simplicity in construction and production.

In order to achieve this object, the inventors have recognized that the power flow in the transmission needs to be divided into at least two power branches with at least two hydraulic circulations. For this purpose, the transmission comprises in a preferred embodiment a superposition gear which is at least indirectly in operative connection with the input shaft and divides the power flow among a first and second power branch. The first power branch is connected at least indirectly with the output shaft which drives the electric generator. The demanded constancy of the frequency of the output shaft is achieved by the open-loop or closed-loop control of the power flow in the second power branch.

In accordance with the invention, the second power branch comprises at least two hydrodynamic circulations, with at least one of the hydrodynamic circulations producing an operative connection between the first power branch and the second power branch on the driven side to the superposition gear. Notice must be taken that the power flow in the second power branch can be directed both forwards or backwards. The forwards direction shall be understood in such a way that the power flow occurs in the driven direction. In this case, the power introduction is set from the second to the first power branch by means of the hydrodynamic circulation connecting the first and the second power branch. If the power is guided back to the second power branch instead, meaning that it flows back from the first power branch to the superposition gear, there is consequently a reactive power flow which can also be regulated in such a way that the mentioned requirements placed on the transmission of the power-generating plant are fulfilled.

In addition to the first hydrodynamic circulation, the second power branch comprises at least one second hydrodynamic circulation. The additional constructional effort required for the second hydrodynamic circulation is offset by a large number of advantages. On the one hand, the second hydrodynamic circulation can have a different design or a different configuration in comparison with the first hydrodynamic circulation.

Suitable hydrodynamic circulations are hydrodynamic converters, hydrodynamic couplings, retarders and TRILOK torque converters. Each one of these hydrodynamic circulations offers benefits for certain applications or operating areas. If a hydrodynamic converter is used for coupling the first and second power branch, then this leads to the special advantage that the characteristics of the hydrodynamic converter correspond to the characteristics of a power transducer driven by a natural resource such as a wind rotor or a water turbine and for this reason the required constancy of the frequency of the driven shaft is obtained automatically as a result of self-regulation characteristics, which will be explained below in closer detail.

Although it is not possible to realize any self-regulation characteristics for a hydrodynamic coupling, there are still advantages for a hydrodynamic coupling in comparison with a hydrodynamic converter due to the high efficiency in certain operating areas. This applies especially to the full-load area where the input speed of the transmission is guided and is limited in most cases. The TRILOK torque converter on the other hand combines advantages in certain operating areas with respect to efficiency and control characteristics. As a result, different hydrodynamic circulations each offer advantages for certain operating areas or operating states, so that different types of hydrodynamic circulations can be combined when using at least two hydrodynamic circulations. Depending on the requirements, it is then possible to switch between the hydrodynamic circulations or to change the respective weighting. This can be fulfilled in the easiest way by setting the filling level with working medium in the hydrodynamic circulations.

In addition to the use of different designs of hydrodynamic circulations, it is also possible to use several similar types such as two hydrodynamic converters which are arranged parallel in the second power branch. They differ by their design characteristics or as a result of transmission components assigned upstream or downstream. It is thus possible to adjust the transmission in accordance with the invention to different operating states. If different designs are available, it is also possible by changing the design to adjust in an improved manner to the time-changeable power potential of the natural resource.

An advantageous embodiment of the invention further provides that the second hydrodynamic circulation is used for the open-loop and closed-loop control of a first hydrodynamic circulation. The first hydrodynamic circulation usually assumes the task of regulating or controlling the power flow from the first power branch to the second power branch and vice-versa. This is usually achieved by a reaction member. These are the guide blades for a hydrodynamic circulation for example. If the requirement arises from a certain operating state that the self-regulation characteristic and the thus linked optimal setting of the guide blades is left, then it is necessary to change the originally optimal setting of the guide blades. This leads to flow losses in the hydrodynamic converter and a reduced efficiency in this connection. Moreover, a mechanical adjusting mechanism which is necessary for this purpose is not free from wear and tear, which plays a role in the respect that for all operating states outside of the self-regulation characteristic it is necessary to react to the fluctuating power input from the natural resource by providing a permanent change in the guide blade setting. In addition to the frequency of the setting of the guide blade position, it is also necessary to take note in this case of the usually high requirements placed on the reaction speed. With the second hydrodynamic circulation (e.g. a retarder), the necessary adjustment is not achieved by an adjusting movement of the action member, which in the case of a hydrodynamic converter are the guide blades, but rather by a weighting between the first and the second hydrodynamic circulation in the second power branch. If a change in the weighting on the other hand is produced by setting the respective filling level with working medium, such a change can be performed virtually without wear and tear and can be repeated as often as desired.

The invention is now explained in closer detail by reference to the enclosed drawings, wherein.

Figure 7:
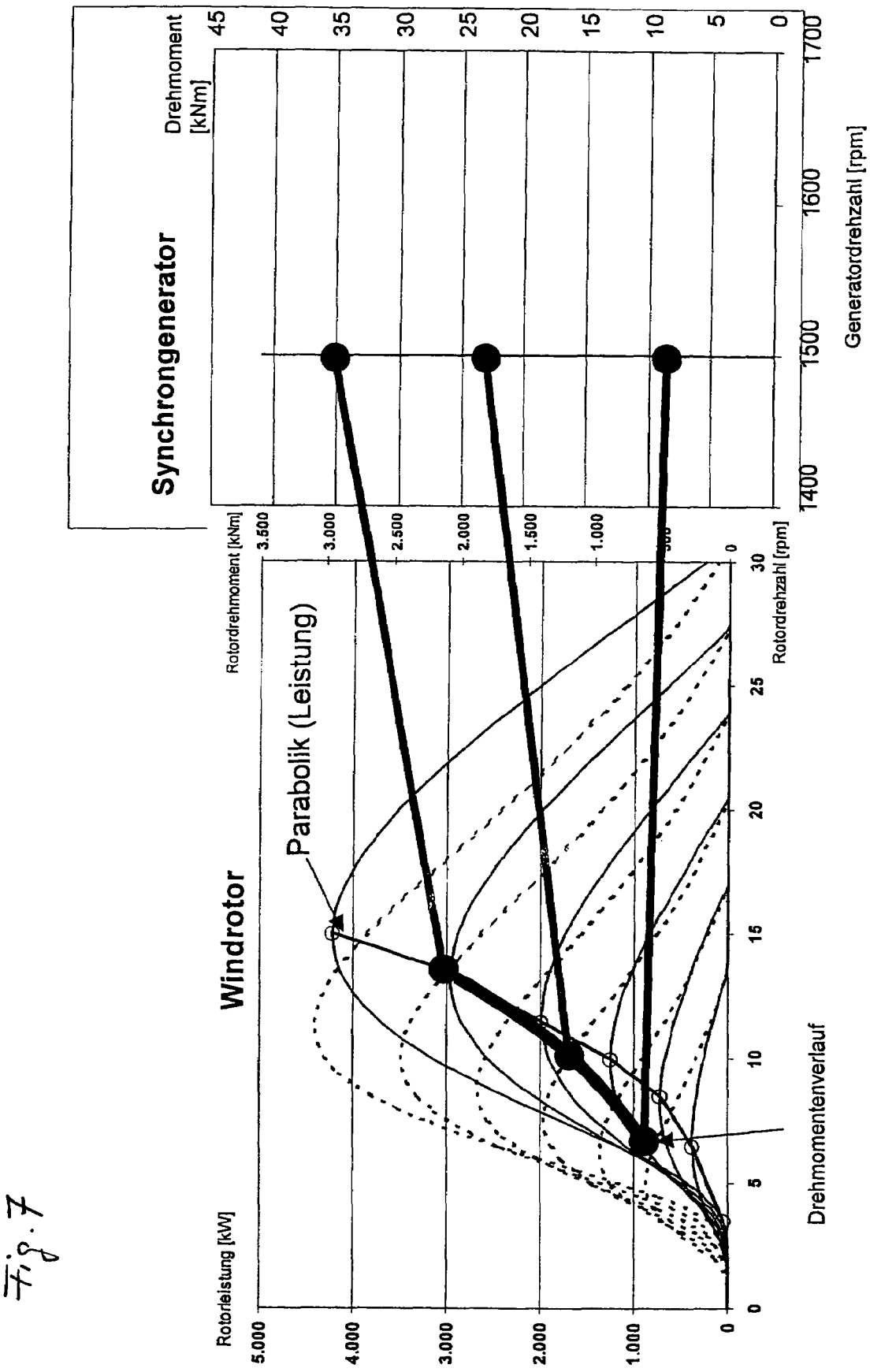

FIG. 7 schematically shows the active-power curve at the best point of a wind power station.

The rotor power $p_R$ of a wind power station is in connection by approximation with the wind speed $v_w$:

$$p_R = k\, c_p(v_w, \omega_R, \beta) v_w^3$$

The expression k combines various constant values such as the blade geometry and the density of the air. $c_p$ further designates the power conversion coefficient, which on its part depends on the wind speed $v_w$, the rotor speed $\omega_R$ and the angular position of the rotor blades, the so-called pitch angle $\beta$. This power conversion coefficient is characterized by a global maximum which shifts towards higher rotor speeds $\omega_R$ under rising wind speeds $v_w$.

FIG. 7 shows this connection by showing the real power of a wind rotor by taking various wind speeds into account. The figure shows a group of curves (continuous curves), which by way of example show the power taken up by a wind rotor with a diameter of 70 m from the air flow at constant rotor blade position for the wind speeds of 18 m/s, 16 m/s, 14 m/s, 12 m/s, 10 m/s, 8 m/s for various rotor speeds. The displacement of the optimal rotor speed towards higher values with rising wind speed is characteristic. The respective power maximums are situated on a curve which is also known as parabolics. Guiding the speed along this curve of optimal power absorption is designated below as power-optimal speed guidance for the input shaft of the transmission in accordance with the invention. A variable-speed system can thus be operated at optimal power conversion coefficients depending on the available wind speed. In addition to variable-speed operation at partial load, wind power stations are typically configured for certain nominal power in conjunction with a nominal speed which are each reached and held at full load.

FIG. 7 shows the torque of the wind rotor for the above wind speeds for different rotor speeds on the basis of the group of curves shown with the broken lines. The illustrated torque curves are associated with the powers that depend on the wind speed, i.e. there is a torque value which belongs to each power-optimal speed, which does not correspond to the maximum torque at the respective wind speed but assumes another value (see in this connection the bold torque progress curve in FIG. 7). The electric generator is driven with this torque taken up by the wind rotor via the transmission in accordance with the invention. The torque/speed ratio for a synchronous generator as shown in FIG. 7 proves that for an impressed system frequency of 50 Hz on the driven shaft of the transmission a constant speed of 1500 rpm (for this example) is predetermined on the driven side for the different transmitted torques. If an asynchronous generator is used instead of the synchronous generator, the situation can be seen accordingly, because in operation in the linear region it is possible to assume such a steep torque/speed ratio that the speed of the driven shaft of the transmission has a substantially constant value.

Figure 1:
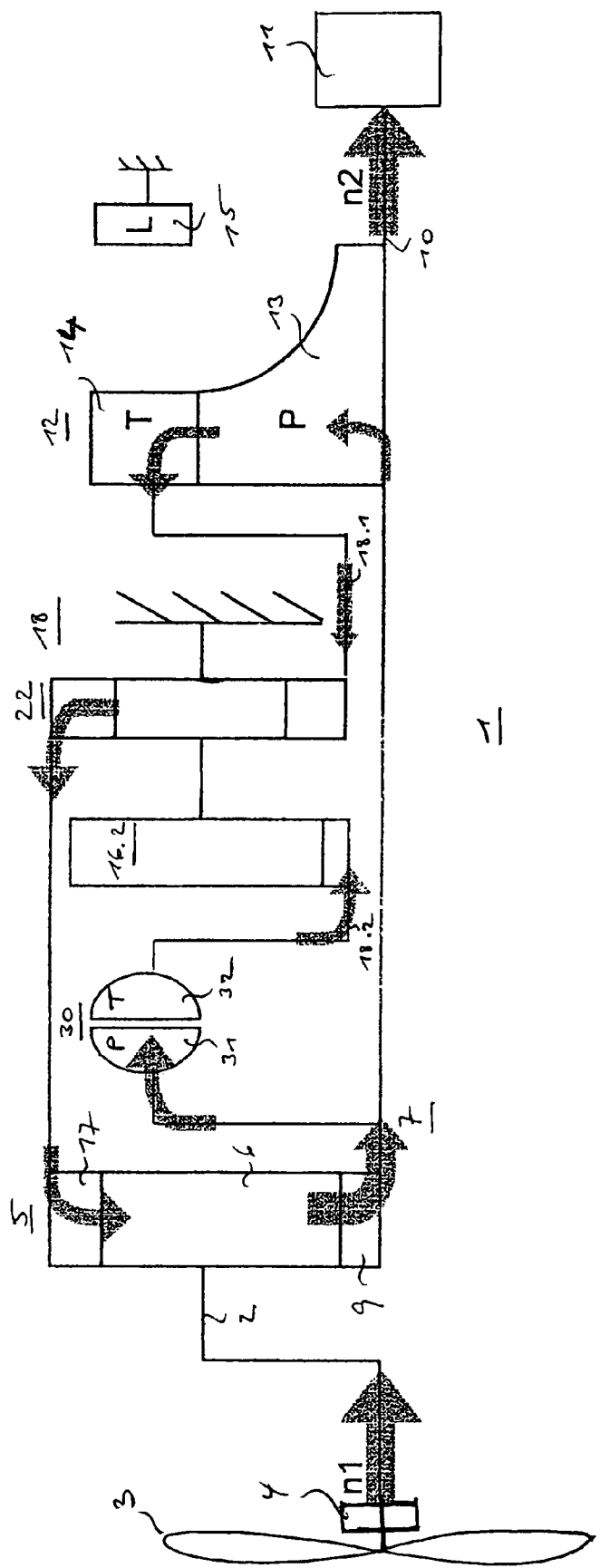
FIG. 1 shows a variable-speed transmission with a first and second power branch, with the second power branch comprising a hydrodynamic converter and a hydrodynamic coupling.

FIG. 1 shows a first embodiment of a transmission 1 in accordance with the invention. It comprises a first power branch 7 and a second power branch 18, with two hydrodynamic circulations, a hydrodynamic converter 12 and a hydrodynamic coupling being arranged in parallel in the second power branch. Both are in an at least indirect operative connection with the first power branch 7. The illustration shows a transmission 1 in detail whose input shaft 2 is connected at least indirectly with a wind power station. In the present case, a first transmission 4 is positioned with a constant transmission ratio between the rotor 3 of the wind power station and the input shaft 2. In the embodiment as shown here, a superposition gear 5 for branching the power in transmission 1 (for example a planetary gear) is used, with the input shaft 2 being in connection with the planet carrier 6 and driving the same with speed n1.

On the driven side to the superposition gear 5 there are now two power branches. The first power branch 7 guides power via the sun wheel 9 to the output shaft 10 of the transmission 1. This output shaft 10 which revolves with a constant speed drives the electric generator 11 at least indirectly and is in operative connection with the hydrodynamic converter 12. For this purpose, the output shaft 10 is connected at least indirectly with the pump wheel 13 of the hydrodynamic converter 12. A guide wheel with adjusting blades is used as a reaction member 15 in the hydrodynamic converter 12, with which the power flow to the turbine wheel 14 can be set. The reaction member is arrested at an optimized position in the present embodiment during the operation of the transmission 1.

The turbine wheel 14 of the converter 12 is in an at least indirect connection with a further gear component in the second power branch 18 (e.g. a second superposition gear 22) which is used for the combination of the partial power flows for the two hydrodynamic circulations. Each of the hydrodynamic circulations is associated with a partial power flow. A first partial power flow 18.1 occurs by the hydrodynamic converter 12 and a second partial power flow 18.2 by the other hydrodynamic coupling 30. For this purpose, the pump wheel 31 of the hydrodynamic coupling 30 is in an at least indirect operative connection with the first power branch 7 and transmits, depending on the filling level with working medium in the hydrodynamic coupling 30, a torque or a power flow via the turbine wheel 32 and an interposed gear component such as a stationary transmission 16.2 to the further transmission components 16.2 and the second superposition gear 22.

The relative ratio between the first partial power flow 18.1 and the second partial power flow 18.2 can be set by the filling levels with working medium in the hydrodynamic converter 12 and the hydrodynamic coupling 30. When there is a partial load condition on the energy-absorbing wind rotor 3, it is preferable to activate merely the hydrodynamic converter. The same comprises a respectively optimized, but fixed position of the reaction member 15. In the transition to full load there is a change to the hydrodynamic coupling, which allows reducing the rotor speed of the wind power station.

Figure 2:
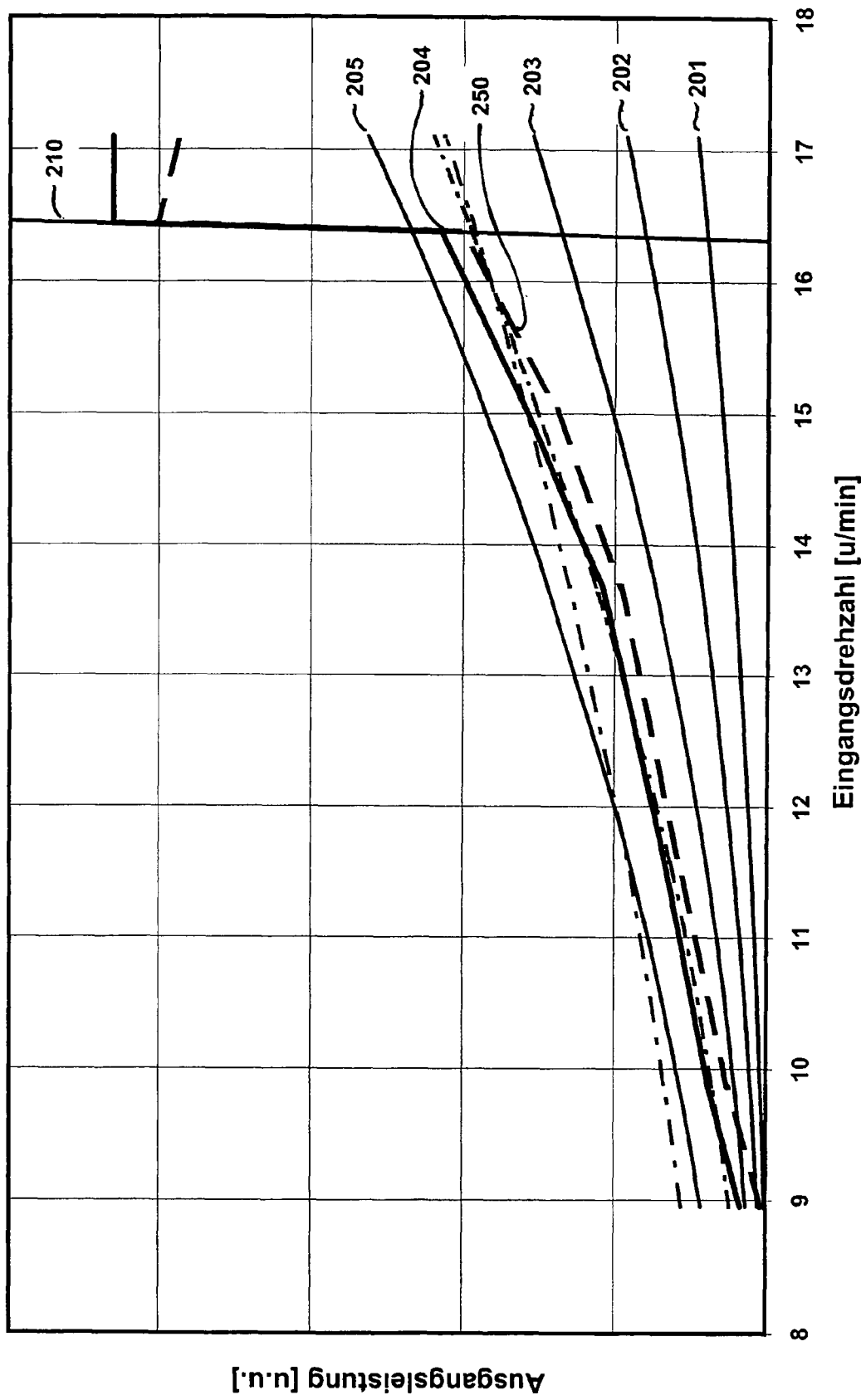
FIG. 2 shows the power/speed characteristics for a transmission according to FIG. 1.

FIG. 2 shows the different operating ranges for a transmission according to FIG. 1 where either the hydrodynamic converter 12 or the hydrodynamic coupling 30 are activated. The illustration shows the mechanical output of the transmission 1 depending on the input speed. A first transmission was omitted for reasons of simplification, so that the input speed corresponds to the rotor speed in the case of a wind power station. The output is stated in random units because the respective absolute values depend on the individual size and geometry of the power transducer of the power-generating plant. The transmission is operated in the converter range in the present embodiment for input numbers below 16.3 rpm. A group of curves 201, 202, 203, 204 and 205 are shown. Each curve corresponds to a different setting of the reaction member 15 of the hydrodynamic converter 12.

The transmission ratio in the superposition gear 5 and optionally the further gear components which may be provided upstream or downstream to the converter is chosen within the scope of the expertise of the person skilled in the art. Similarly, the dimensioning of the converter is adjusted, so that the power absorption characteristics of the rotor 3 of the wind power station is emulated substantially by the converter for an optimal position of the reaction member and that thus a constant speed can be achieved on the output shaft 10 within the terms of self-regulation characteristics. The wind rotor can thus be operated with the power-optimized speed along the parabolics. This optimal position of the reaction member 15 substantially corresponds to the one with the reference numeral 204. The electric power of the generator in the converter region will follow this characteristic accordingly, which is shown in FIG. 2 with a broken line 250 for the rotor speeds <16.3 rpm. Moreover, the transmission 1 in accordance with the invention translates the typically low input speed into a high output speed which drives the generator. The hydrodynamic circulations which are arranged on the driven side to the superposition gear 5 for power branching in the second power branch can be operated with a high rotational speed and thus efficiently.

In the present embodiment, it is necessary to provide a speed limitation of the wind rotor for higher power inputs. The reasons for this can be the noise development or aspects concerning the strength of individual components. For this purpose, a changeover is made to the hydrodynamic coupling 30 preferably above a certain speed threshold and the output follows the curve 210 which is associated with the hydrodynamic coupling. The precise position and the steepness of the characteristic curve can be configured by the dimensioning of the hydrodynamic coupling 30 and the gear components associated with the same upstream or downstream within the discretion of the person skilled in the art. In a further development, the transition between the converter region and the coupling region can be switched in a graduated manner by partly filling or emptying the respective hydrodynamic circulations.

In the coupling region, there is preferably such a steep characteristic curve of the hydrodynamic coupling 210, so that a limitation of the rotor speed is achieved within a wide margin.

A changeover from the converter region to the coupling region is preferably also made for the above described transmission 1 in accordance with the invention when the hydrodynamic coupling 30 has a higher efficiency relative to the hydrodynamic converter 12. Power losses in the transmission can thus be minimized.

Since the hydrodynamic coupling 30 needs to be configured in a controllable manner anyway, it is preferred to run through with the hydrodynamic coupling 34 further special operational situations such as the starting or the breaking of the power-generating plant. Such a preferred application of the high dynamic coupling is also given in the case of load shedding. The changeover between the different hydrodynamic circulations can be achieved by setting the filling level with the working medium in the hydrodynamic converter 12 or the hydrodynamic coupling 30.

Figure 3:
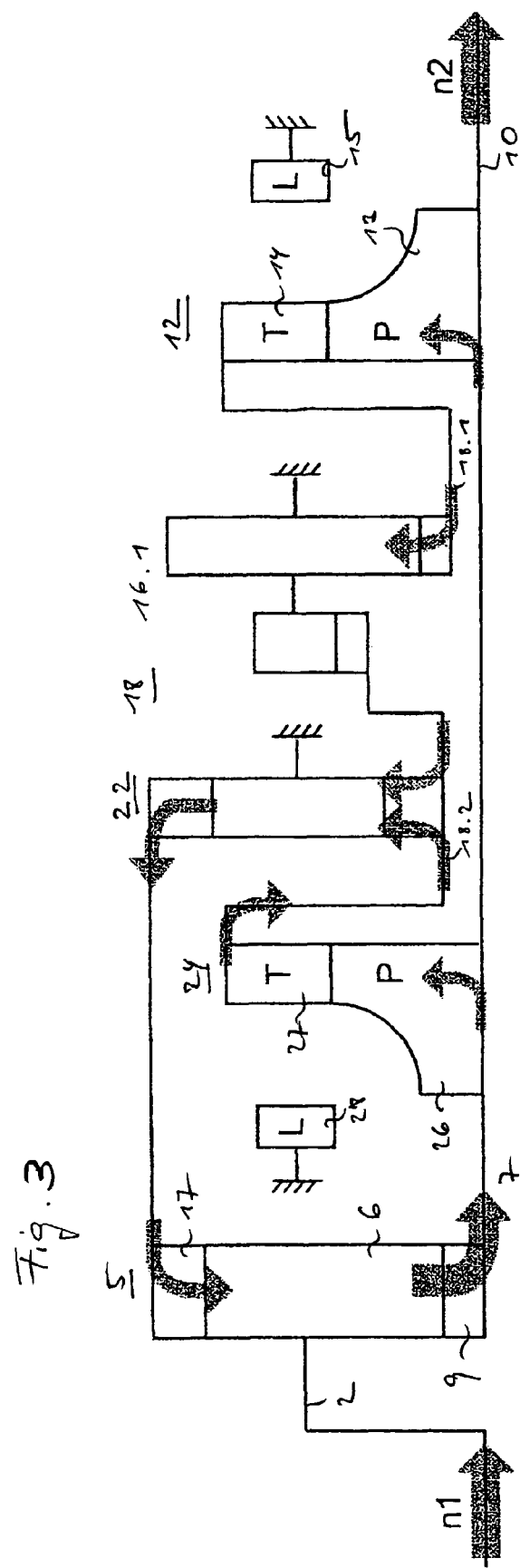
FIG. 3 shows a variable-speed transmission with a first and second power branch, with the second power branch comprising two hydrodynamic converters.

A further preferred embodiment of the second power branch 18 of the transmission is shown in FIG. 3. The connection between the first power branch 7 and the second part branch 18 is produced by two hydrodynamic circulations of the same type, the first hydrodynamic converter 12 and a second hydrodynamic converter 24.

The parallel partial power flows 18.1 and 18.2 in the second power branch 18 which start out from the first hydrodynamic converter 12 and the second hydrodynamic converter 24 are combined by a further gear component (e.g. a second superposition gear 22) and guided back via the internal geared wheel 17 to the superposition gear 5. Both the first as well as the second hydrodynamic converter each access the first power branch 7 at least indirectly via their pump wheels 13, 25 and are each at least in indirect operative connection with the second power branch 18 via the turbine wheels 14 and 27. The guide wheels 15 and 28 are shown as being set in a fixed manner in the present case.

By using two hydrodynamic converters 12, 24 in parallel pick-off from the first power branch 7 it is possible to switch between two different configurations of the transmission 1. The differences in design can be produced by the constructional adjustment of the first and second hydrodynamic converter 12 and 24 and by interposing additional gears in the partial branches. This is shown in FIG. 2 on the basis of stationary transmission 16.1 which is integrated in the partial branch starting from the first hydrodynamic converter 12 for the first partial power flow 18.1. By using two hydrodynamic converters it is possible to extend the self-regulation characteristics of the transmission over a wide range of power input. It is also possible to configure the second hydrodynamic converter and possible downstream gear components in the second power branch in such a way that the second partial branch for the second partial power flow 18.2 is used for the transition to the full-load region, such that rotor speed is guided along a setpoint curve in addition to the speed of the output shaft which is kept substantially constant.

The ratio of the partial power flows through the first hydrodynamic converter 12 and the second hydrodynamic converter 24 can be achieved in a wear-free manner through a respective setting of the filling level with working medium. It is also possible to operate each hydrodynamic converter on its own. A parallel operation and the individual setting of the speed/torque ratio for each hydrodynamic converter are possible. Moreover, a changeover is made according to a preferred embodiment of the invention between the two hydrodynamic converters 12, 23, which means that they are not operated simultaneously with the exception of one changeover range which is limited to a narrow speed interval. As a result, the entire power flow on the second power branch 18 outside of the changeover region is associated either to the first partial power flow 18.1 or the second partial power flow 18.2.

Figure 4:
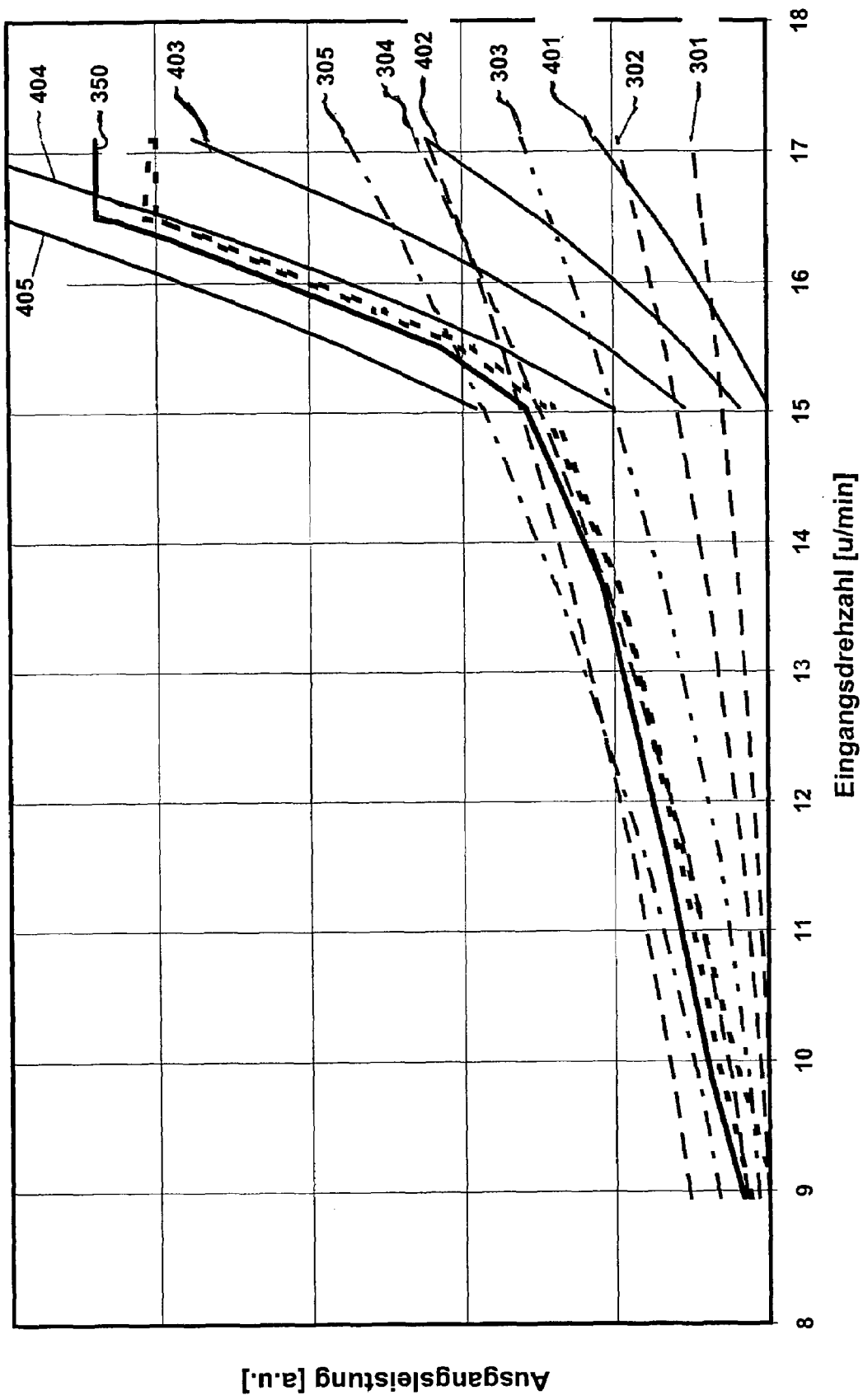
FIG. 4 shows the power/speed characteristics for a transmission according to FIG. 3.

FIG. 4 shows the family of characteristics 42 differently configured hydrodynamic converters 12 and 24 for a transmission in accordance with the invention according to FIG. 3. According to FIG. 2, the output of the transmission 1 is entered in random units against the input speed. A family of characteristics with broken lines is shown for the first hydrodynamic converter 12 the different settings of the reaction member 301, 302, 303, 304 and 305. The self-regulation characteristics are linked to an optimal setting of the reaction member which substantially remains the same. In the present illustrated case, this corresponds substantially to the setting with the reference numeral 304. The second hydrodynamic converter is configured for higher input speeds and shows a steeper family of characteristics. This is possible within the scope of the expertise of the person skilled in the art by respective dimensioning of the second hydrodynamic converter 24 and by providing upstream or downstream gear components. In FIG. 3, a stationary transmission 16.1 is associated on the turbine side to the first hydrodynamic converter for example, whereas this was omitted for the second hydrodynamic converter 24.

In FIG. 4, the family of characteristics assigned to the second hydrodynamic converter 24 is outlined by the group of curves 401, 402, 403, 404 and 405, with each of these curves corresponding to a different position of the reaction member 28 of the second hydrodynamic converter 24. In accordance with this, the group of curves 301, 301, 303, 304 and 305 outline the input speed/output characteristics of the transmission when filling the first hydrodynamic converter 12, each for different position of the reaction member 15.

It is now possible to change over between the two groups of characteristics by making a respective setting of the respective filling level with the working medium for the two hydrodynamic converters 12, 24. This occurs in FIG. 4 above a rotor speed of 15 rpm, so that the resulting ratio of the input speed and output for the embodiment of a transmission in accordance with the invention as shown here is designated with the reference numeral 350, with an optimal setting of the reaction member being chosen for both converters.

Figure 5:
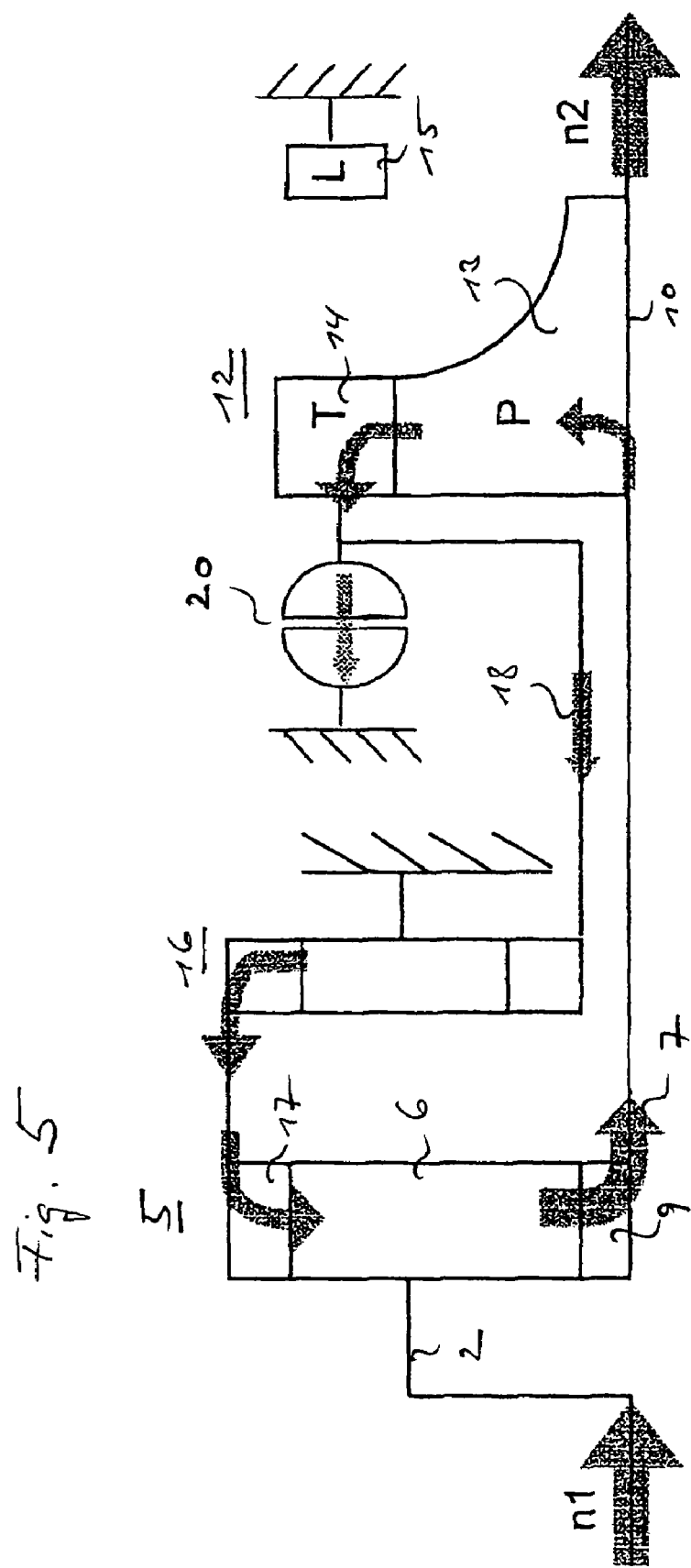
FIG. 5 shows a variable-speed transmission with a first and second power branch, with the second power branch comprising a hydrodynamic converter and a retarder.

FIG. 5 shows a further embodiment of a variable-speed transmission in accordance with the invention with a power branch between a first power branch 7 and a second power branch 18 by means of a superposition gear 5, with the second power branch 18 comprising two hydrodynamic circulations arranged in parallel. In the present case these are a hydrodynamic converter 12 and the retarder 20. The further components correspond to the drive trains according to FIGS. 1 and 3 and are designated with corresponding reference numerals.

As a modification to the embodiments as described above, the embodiment according to FIG. 5 only comprises a connection on the driven side of the first power branch 7 and of the second power branch 18 via a hydrodynamic converter 12. Although the second hydrodynamic circulation in the second power branch 18 (retarder 20) also acts back at least indirectly to the superposition gear 5, it does not link the first power branch 7 with the second power branch 18.

Figure 6:
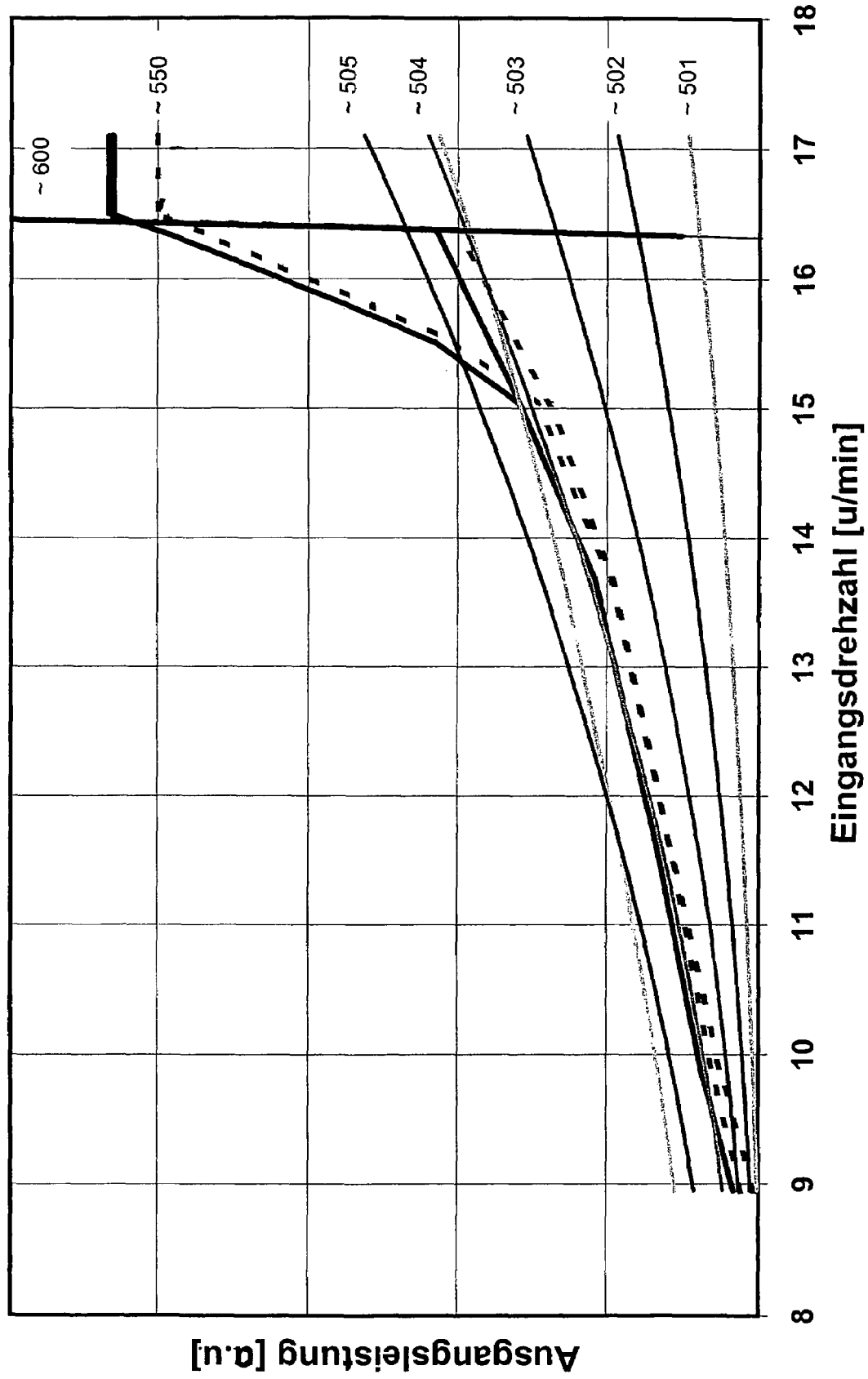
FIG. 6 shows the power/speed characteristics for a transmission according to FIG. 5.

FIG. 6 on the other hand shows that the retarder is used for leaving the region of power-optimal guidance in the transition to full load without requiring any adjustment in the first hydrodynamic circulation, namely the hydrodynamic converter 12. It is operated with a constant setting of the reaction member 15, i.e. with a constant setting of the guide blades. FIG. 6 again shows in detail the input speed entered against the output in random units. Below a speed threshold, which in the present case is slightly above 16 rpm, only the hydrodynamic converted 12 is filled and operated with a fixed position of the guide wheel where the wind rotor revolves in a power-optimal manner. In the present example it substantially corresponds to the setting of the reaction member which is designated with the reference numeral 504. The further curves 501, 502, 503 and 505 of the group of characteristics are assigned to further positions of the reaction member which are not optimal for the present case. The retarder 20 is filled above the mentioned speed threshold, to which retarder there is assigned a retarder characteristic 600. It is substantially steeper than the chosen converter characteristics, so that substantially there is a limitation in the rotor speed. The thus resulting electric power output of the generator depending on the rotor speed is shown in FIG. 6 with the curve 550 which is shown in a broken line.

The advantage of a transmission in accordance with the invention according to FIG. 5 as compared with a variant where the second hydrodynamic circulation (which in this case is the retarder 20) is that in the event that the operating state of power-optimal guidance of the wind power station needs to be left (e.g. because a limitation in the rotor speed becomes necessary under full load conditions for example) there is no mandatory change in the guide wheel position. Without the second hydrodynamic circulation it would then generally not be possible to work with a substantially constant guide wheel position over a wide power range of the natural resource. Instead, the power flow via the hydrodynamic converter 12 would have to be controlled actively via a time-variable setting of the guide wheel. In addition to the high requirements placed on the mechanical wear and tear and the reactivity, it is disadvantageous in such case that the hydrodynamic converter 12 can no longer be operated with the highest possible efficiency. According to FIG. 3, an additional hydrodynamic circulation (which in this case is a retarder 20) is integrated in the second power branch 18 parallel to the hydrodynamic converter 12. In order to avoid an adjustment of the guide wheel 15 of the hydrodynamic converter 12 for special operating states outside of the power-optimal operating state of the self-regulation, the filling level in retarder 20 is adjusted in such a way that the power flow is controllable on the second power branch 18 without changing the setting of the hydrodynamic converter 12. Moreover, it is also possible to change over completely from the hydrodynamic converter 12 to the retarder 30 in accordance with the explanations above. In such a transition from the converter to the retarder region, the connection between the first power branch 7 and the second power branch 18 of the transmission 1 in accordance with the invention is then also interrupted.

Within the scope of expertise known to the person skilled in the art it is further possible to realize further embodiments of the inventive idea of a power-branched transmission with at least two hydrodynamic circulations in one of the drive trains for the open-loop or closed-loop control of the power flow. It is especially also possible to use more than two hydrodynamic circulations and to realize further different designs and types of configurations of hydrodynamic circulations.

In addition to the transmission in accordance with the invention, a method is disclosed for controlling the at least two hydrodynamic circulations in the second power branch. In particular, this method controls or regulates the filling level of the individual hydrodynamic circulations depending on the operating state and the energy input by the wind or water rotor. Preferably, the weighting above a certain input speed threshold is changed. It is also possible to use several staggered threshold values and to make the change in the weighting of the individual hydrodynamic circulations in a graduated manner. It is alternatively also possible to produce a complete changeover from a first hydrodynamic circulation to at least one second hydrodynamic circulation by exceeding a certain speed threshold by the rotor or by the occurrence of a certain operating state. This leads to a complete emptying or complete filling of the leaving or coming hydrodynamic circulation.

The invention claimed is:

1. A variable-speed transmission for a power-generating plant, the transmission comprising:
   an input shaft connected to a power transducer of a wind-energy generator or hydro-electric generator;
   an output shaft connected to an electric generator, wherein the speed of the output shaft is substantially constant; and
   a superposition gear connected to the input shaft and dividing power among the output shaft and a second power branch;
   wherein the second power branch comprises at least two hydrodynamic circulations, wherein at least one of the hydrodynamic circulations is continuously connected to the output shaft.

2. The variable-speed transmission of claim 1, wherein the at least two hydrodynamic circulations are selected from the group consisting of a hydrodynamic converter, a hydrodynamic coupling, a torque converter, a retarder, and any combination thereof.

3. The variable-speed transmission of claim 1, wherein the hydrodynamic circulations are arranged in the second power branch in parallel.

4. The variable-speed transmission of claim 1, further comprising means for changing the filling level of the working medium in the individual hydrodynamic circulations of the second power branch.

5. The variable-speed transmission of claim 1, wherein a hydrodynamic converter is used as one of the hydrodynamic circulations in the second power branch; wherein the hydrodynamic converter is operated with a fixed guide wheel position.

6. The variable-speed transmission of claim 1, wherein the output shaft rotates at a higher speed than the input shaft.

7. The variable-speed transmission of claim 1, wherein the second power branch comprises at least one stationary transmission.

8. The variable-speed transmission of claim 1, wherein the connection between the output shaft and the second power branch comprises a hydrodynamic converter that is used as one of the hydrodynamic circulations in the second power branch comprising:
- a pump wheel connected with the output shaft; and
- a turbine wheel connected with the second power branch.

9. The variable-speed transmission of claim 1, wherein the connection between the output shaft and the second power branch comprises a hydrodynamic coupling that is used as one of the hydrodynamic circulations in the second power branch comprising:
- a pump wheel connected with the output shaft; and
- a turbine wheel connected with the second power branch.

10. The variable-speed transmission of claim 1, wherein the connection between the output shaft and the second power branch comprises a torque converter that is used as one of the hydrodynamic circulations in the second power branch comprising:
- a pump wheel connected with the output shaft; and
- a turbine wheel connected with the second power branch.

11. The variable-speed transmission of claim 1, further comprising a retarder connected to the second power branch.

12. The variable-speed transmission of claim 1, further comprising a second superposition gear combining a first power flow from a first hydrodynamic circulation with a second power flow from a second hydrodynamic circulation, the first and second power flows being combined in the second power branch.

13. The variable-speed transmission of claim 12, wherein the first hydrodynamic circulation is a hydrodynamic converter and wherein the second hydrodynamic circulation is a hydrodynamic coupling.

14. The variable-speed transmission of claim 13, further comprising a stationary transmission interposed between the hydrodynamic coupling and the second superposition gear.

15. The variable-speed transmission of claim 12, wherein the first and second hydrodynamic circulations are hydrodynamic converters.

16. The variable-speed transmission of claim 15, further comprising a stationary transmission interposed between the second superposition gear and a turbine wheel of at least one of the hydrodynamic converters.

17. A power-generating plant, comprising:
- a power transducer;
- an electric generator;
- a variable-speed transmission, comprising:
  - an input shaft connected to a power transducer of a wind-energy generator or hydro-electric generator;
  - an output shaft connected to an electric generator, wherein the speed of the output shaft is substantially constant; and
  - a superposition gear connected to the input shaft and dividing power among the output shaft and a second power branch;
  - wherein the second power branch comprises at least two hydrodynamic circulations, wherein at least one of the hydrodynamic circulations is continuously connected to the output shaft.

18. The power-generating plant of claim 17, wherein the hydrodynamic circulations in the second power branch of the transmission are filled at a rate that depends on an input speed of the transmission.

19. The power-generating plant of claim 17,
wherein a first hydrodynamic circulation is filled with working medium and a second hydrodynamic circulation is emptied of working medium below a first speed threshold for an input speed, and
wherein the first hydrodynamic circulation is emptied of working medium and the second hydrodynamic circulation is filled with working medium above a second speed threshold for the input speed.

20. A variable-speed transmission for a power-generating plant, the transmission comprising:
- an input shaft connected to a power transducer of a wind-energy generator or a hydro-electric generator;
- an output shaft connected to an electric generator, wherein the speed of the output shaft is substantially constant;
- a first superposition gear connected to the input shaft and dividing power among a first power branch connected to the output shaft and a second power branch,
- wherein the second power branch comprises at least two hydrodynamic circulations,
- wherein at least one of the hydrodynamic circulations is connected to the first power branch,
- wherein the hydrodynamic circulations comprise a first hydrodynamic circulation that is a hydrodynamic converter,
- wherein the hydrodynamic circulations comprise a second hydrodynamic circulation that is a hydrodynamic coupling,
- wherein the hydrodynamic converter has a first power flow and the hydrodynamic coupling has a second power flow and a second superposition gear combines the first power flow from the hydrodynamic converter with the second power flow from the hydrodynamic coupling, the first and the second power flows being combined in the second power branch, and
- wherein the hydrodynamic coupling and the second superposition gear have a stationary transmission interposed therebetween.

21. A variable-speed transmission for a power-generating plant, the transmission comprising:
- an input shaft connected to a power transducer of a wind-energy generator or a hydro-electric generator;
- an output shaft connected to an electric generator, wherein the speed of the output shaft is substantially constant;
- a first superposition gear connected to the input shaft and dividing power among a first power branch connected to the output shaft and a second power branch,
- wherein the second power branch comprises at least two hydrodynamic circulations,
- wherein at least one of the hydrodynamic circulations is connected to the first power branch,
- wherein the hydrodynamic circulations comprise a first hydrodynamic circulation with a first power flow and a second hydrodynamic circulation with a second power flow and a second superposition gear combines the first power flow from the first hydrodynamic circulation with the second power flow from the second hydrodynamic circulation, the first and the second power flows being combined in the second power branch,
- wherein the first and the second hydrodynamic circulations are hydrodynamic converters, and
- wherein the second superposition gear and a turbine wheel of at least one of the hydrodynamic converters has a stationary transmission is interposed therebetween.

22. A power-generating plant, comprising:
- a power transducer;
- an electric generator;
- a variable-speed transmission comprising:
  - an input shaft connected to a power transducer of a wind-energy generator or hydro-electric generator;

an output shaft connected to an electric generator, wherein the speed of the output shaft is substantially constant; and a superposition gear connected to the input shaft and dividing power among a first power branch connected to the output shaft, and a second power branch, wherein the second power branch comprises at least two hydrodynamic circulations, wherein at least one of the hydrodynamic circulations is connected with the first power branch;

wherein the hydrodynamic circulations comprise a first hydrodynamic circulation that is filled with working medium and a second hydrodynamic circulation that is emptied of working medium below a first speed threshold for an input speed, and wherein the first hydrodynamic circulation is emptied of working medium and the second hydrodynamic circulation is filled with working medium above a second speed threshold for the input speed.

* * * * *